US007477038B2

(12) United States Patent
Taniguchi

(10) Patent No.: US 7,477,038 B2
(45) Date of Patent: Jan. 13, 2009

(54) VEHICLE-MOUNTED POWER SUPPLY SYSTEM

(75) Inventor: Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 134 days.

(21) Appl. No.: 11/185,706

(22) Filed: Jul. 21, 2005

(65) Prior Publication Data

US 2006/0038532 A1    Feb. 23, 2006

(30) Foreign Application Priority Data

Aug. 23, 2004   (JP)   ............................. 2004-241776

(51) Int. Cl.
*H02J 7/00* (2006.01)
(52) U.S. Cl. .................. 320/104; 307/10.1; 320/103
(58) Field of Classification Search ................ 320/103, 320/128, 140, 149, 150, 152, 104, 135; 307/10.1, 307/9.1, 10.7; 903/906, 907
See application file for complete search history.

(56) References Cited

U.S. PATENT DOCUMENTS

| | | | | |
|---|---|---|---|---|
| 5,212,431 | A * | 5/1993 | Origuchi et al. ............. | 318/139 |
| 5,418,401 | A * | 5/1995 | Kaneyuki .................... | 307/10.1 |
| 5,717,310 | A * | 2/1998 | Sakai et al. .................. | 370/10.1 |
| 5,739,671 | A * | 4/1998 | Hamada ...................... | 320/149 |
| 5,808,446 | A * | 9/1998 | Eguchi ........................ | 320/134 |
| 5,814,972 | A * | 9/1998 | Shimada et al. ............. | 320/132 |
| 5,869,951 | A * | 2/1999 | Takahashi ................... | 320/104 |
| 5,945,808 | A * | 8/1999 | Kikuchi et al. .............. | 320/132 |
| 6,188,199 | B1 * | 2/2001 | Beutler et al. ............... | 320/125 |
| 6,232,674 | B1 | 5/2001 | Frey et al. | |
| 6,424,157 | B1 | 7/2002 | Gollomp et al. | |
| 6,439,678 | B1 * | 8/2002 | Norton ......................... | 347/9 |
| 6,483,272 | B1 * | 11/2002 | Terada et al. ................ | 320/103 |
| 6,661,231 | B1 * | 12/2003 | Arai et al. ................... | 324/426 |
| 6,686,724 | B2 * | 2/2004 | Coates et al. ............... | 320/135 |

(Continued)

FOREIGN PATENT DOCUMENTS

DE    196 45 944 A1    5/1998

(Continued)

OTHER PUBLICATIONS

European Search Report for European Patent Application No. 05 01 6323, Feb. 22, 2007.

*Primary Examiner*—Akm E Ullah
*Assistant Examiner*—M'Baye Diao
(74) *Attorney, Agent, or Firm*—Oliff & Berridge, PLC

(57) ABSTRACT

A vehicle-mounted power supply system comprises a first storage battery, an automotive generator for generating electrical energy and charging the first storage battery with the generated electrical energy. A second storage battery is connected to an electrical load and a power converter supplies electric energy from the first storage battery to the second storage battery. A controller, or battery-monitoring unit, sets the power converter in a sleep mode when the vehicle engine is stopped, periodically detects the voltage of the second storage battery as a pseudo-open circuit voltage during the sleep mode of the power converter if current of the second storage battery is within a predetermined range, estimates a state of charge of the second storage battery from the detected pseudo-open circuit voltage and sets the power converter in a run mode when the estimated state of charge is lower than a predetermined value.

18 Claims, 6 Drawing Sheets

U.S. PATENT DOCUMENTS

| | | | |
|---|---|---|---|
| 6,806,588 B2 | 10/2004 | Amano et al. | |
| 6,904,342 B2 * | 6/2005 | Hanada et al. | 701/22 |
| 6,979,977 B2 * | 12/2005 | Amano et al. | 320/104 |
| 6,999,867 B2 * | 2/2006 | Konno | 701/112 |
| 7,049,789 B2 * | 5/2006 | Taniguchi et al. | 320/104 |
| 7,173,396 B2 * | 2/2007 | Gunji | 320/132 |
| 2002/0190690 A1 * | 12/2002 | Tamai et al. | 320/103 |
| 2003/0160510 A1 * | 8/2003 | Mizutani et al. | 307/10.1 |
| 2003/0195719 A1 * | 10/2003 | Emori et al. | 702/183 |
| 2004/0212351 A1 * | 10/2004 | Kneifel et al. | 320/149 |
| 2004/0257045 A1 | 12/2004 | Sada et al. | |
| 2006/0055374 A1 | 3/2006 | Fujihara et al. | |
| 2006/0208739 A1 * | 9/2006 | Schiller et al. | 324/426 |

FOREIGN PATENT DOCUMENTS

| | | |
|---|---|---|
| FR | 2 583 583 A | 12/1986 |
| FR | 2 848 033 A | 6/2004 |
| JP | A-04-094437 | 3/1992 |
| JP | A-2001-239902 | 9/2001 |
| JP | A-2003-068369 | 3/2003 |
| JP | A-2004-031254 | 1/2004 |
| JP | A-2004-191193 | 7/2004 |
| JP | A-2005-014707 | 1/2005 |

* cited by examiner

FROM MONITORING UNIT 7

FROM MONITORING UNIT 7

US 7,477,038 B2

VEHICLE-MOUNTED POWER SUPPLY SYSTEM

CROSS-REFERENCE TO RELATED APPLICATION

This application is based on Japanese Patent Application No. 2004-241776 filed Aug. 23, 2004, which is incorporated herein by reference.

BACKGROUND OF THE INVENTION

1. Field of the Invention

The present invention relates to a vehicle-mounted power supply system capable of efficiently monitoring the state of charge of a rechargeable storage battery when the vehicle is parked.

2. Description of the Related Art

A vehicle-mounted rechargeable storage battery is monitored in a number of ways. In one method, when the engine is started the initial remaining capacity of the battery is calculated from its voltage-current characteristic and subsequently the charge/discharge current of the battery is integrated to determine its remaining capacity, as described in Japanese Patent No. 2910184. Another known method, when the automotive generator is not operating when the vehicle is parked, the voltage of the battery is monitored and its charge-discharge current is integrated. The remaining capacity of the battery is calculated from the monitored voltage and the integrated current value, as described in Japanese Patent Publication No. 2003-68369.

However, in the known methods current sensor and electronic monitoring circuitry need to operate at all times to monitor the battery even though the automotive generator is not working. Under such conditions, the current drained from the current sensor and monitoring circuitry represents the dark current of the battery and dissipates its storage power. As a result, no practical systems have been developed so far that are capable of monitoring the vehicle-mounted storage battery when the engine is stopped. Thus, prolonged parking of a vehicle could result in a storage battery having almost discharged its energy with no remaining power to restart the engine.

SUMMARY OF THE INVENTION

It is therefore an object of the present invention to provide a vehicle-mounted power supply system capable of monitoring a storage battery by keeping its dark current at a minimum.

According to a first aspect of the present invention, there is provided a vehicle-mounted power supply system which comprises a first storage battery, an automotive generator for generating electrical energy and charging the first storage battery with the generated electrical energy, a second storage battery connected to an electrical load, a power converter for supplying electric energy from the first storage battery to the second storage battery, and a controller. The controller, or battery-monitoring unit, sets the power converter in a sleep mode when the vehicle engine is stopped, periodically detects the voltage of the second storage battery as a pseudo-open circuit voltage during the sleep mode of the power converter if current of the second storage battery is within a predetermined range, estimates a state of charge of the second storage battery from the detected pseudo-open circuit voltage and sets the power converter in a run mode when the estimated state of charge is lower than a predetermined value.

Preferably, the pseudo-open circuit voltage is detected if the current is within the range of ±1 ampere.

Preferably, the controller maintains data describing a correlation between a plurality of state of charge values and a plurality of voltage values, wherein the controller is configured to estimate the state of charge by selecting one of the state of charge values of the selected correlation data corresponding to the detected pseudo-open circuit voltage.

Furthermore, a temperature sensor is preferably provided for detecting a temperature of the second storage battery. The controller maintains a plurality of correlation data corresponding to different temperatures of the second storage battery. Each correlation data describes a correlation between a plurality of state of charge values and a plurality of voltage values. The controller selects one of the correlation data corresponding to the detected temperature of the second storage battery and estimates the state of charge by selecting one of the state of charge values of the selected correlation data corresponding to the detected pseudo-open circuit voltage.

According to a second aspect, the present invention provides a method of operating a vehicle-mounted power supply system which comprises a first storage battery, an automotive generator driven by an engine for generating electrical energy and charging the first storage battery with the generated electrical energy, a second storage battery connected to an electrical load, and a power converter for supplying electric energy from the first storage battery to the second storage battery, the method comprising the steps of (a) setting the power converter in a sleep mode when the engine is stopped, (b) periodically detecting the voltage of the second storage battery as a pseudo-open circuit voltage during the sleep mode if current of the second storage battery is within a predetermined range, and (c) estimating a state of charge of the second storage battery from the detected pseudo-open circuit voltage and setting the power converter in a run mode when the estimated state of charge is lower than a predetermined value.

BRIEF DESCRIPTION OF THE DRAWINGS

The present invention will be described in detail with reference to the following drawings, in which.

DETAILED DESCRIPTION

Figure 1:
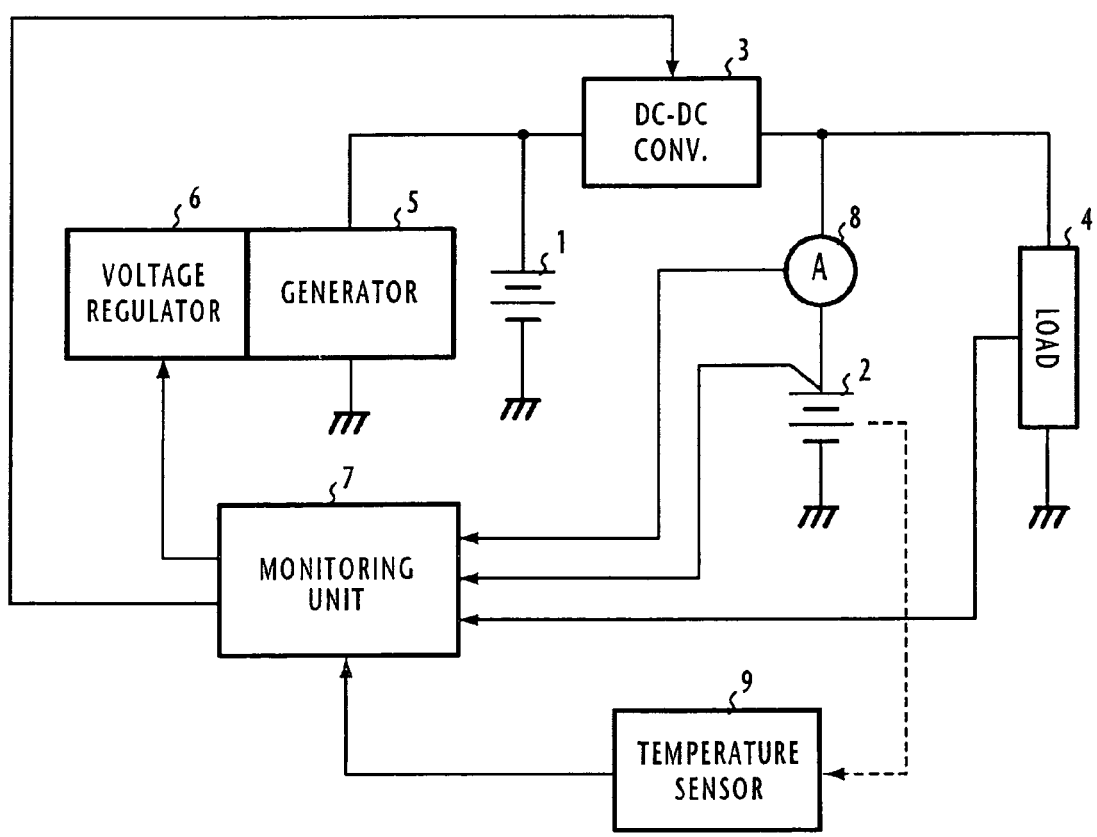
FIG. 1 is a block diagram of a vehicle-mounted power supply system of the present invention.

In FIG. 1, a vehicle-mounted power supply system of the present invention is illustrated. The power supply system comprises two lead-acid batteries 1 and 2. Battery 2 supplies a current to a load circuit 4 and the battery 1 is charged by an automotive generator 5 to a rated voltage higher than the rated voltage of battery 2. Connected between the batteries 1 and 2 is a power converter 3 that performs one-way power conversion from the rated value of battery 1 to that of battery 2. A voltage regulator 6 controls the output voltage of the automotive generator 5 at a substantially constant level by regulating its field coil current according to a control signal supplied from a controller or monitoring unit 7. A current sensor 8 is provided for detecting a charge current from the DC-DC converter 3 to the battery 2 and a discharge current from the battery 2 to the load circuit 4. Automotive generator 5 provides conversion of the mechanical energy of the vehicle engine to electrical energy with which it charges the battery 1. Monitoring circuit 7 monitors the current sensor 8, the battery 2 and the load circuit 4 and controls the voltage regulator 6 and the DC-DC converter 3 with the monitored current and voltage of the battery 2 and the amount of load on the vehicle.

Figure 2:
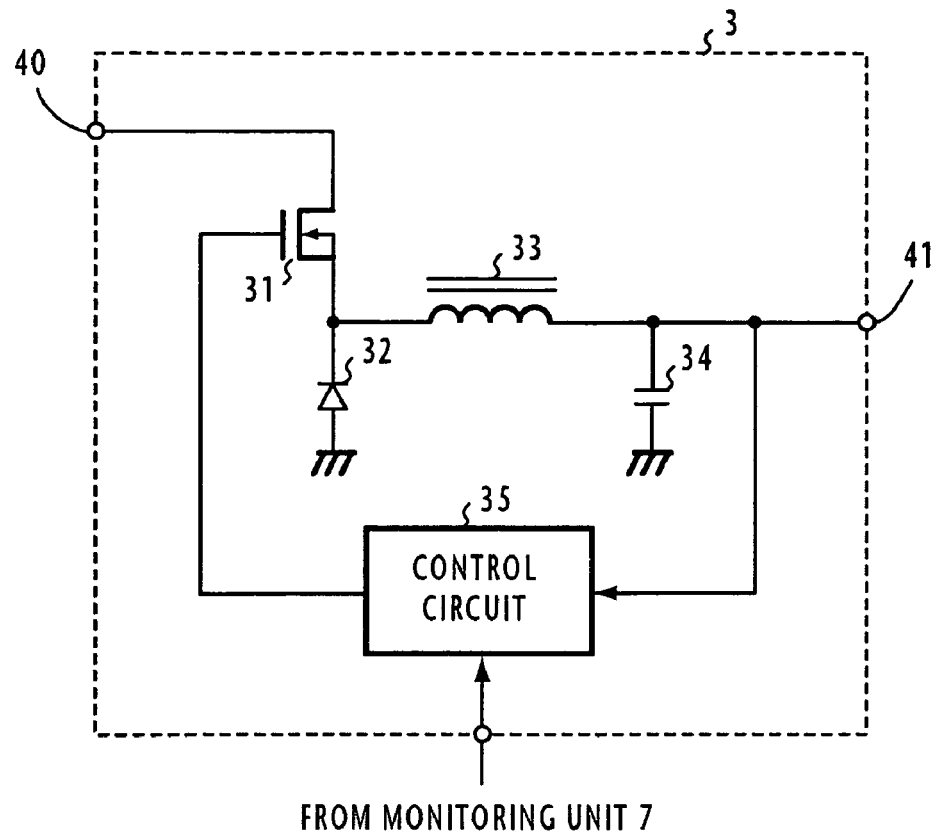
FIG. 2 is a circuit diagram of one example of the DC-DC converter.

One example of the power converter 3 is a DC-DC converter as shown in FIG. 2. DC-DC converter 3 comprises a switching transistor 31, a flywheel diode 32, an inductor 33, a smoothing capacitor 34, and a control circuit 35. Switching transistor 31 has its drain connected to the input terminal 40 of the DC-DC converter 3 and its source connected to one terminal of the inductor 33 and further connected to ground through the diode 32. The other terminal of inductor 33 is connected to the output terminal 41 of the DC-DC converter 3 and further connected to ground through the smoothing capacitor 34. Control circuit 35 is connected between the output terminal 41 and the gate electrode of switching transistor 31 to turn it on and off according to the voltage developed at the output terminal 41. Specifically, the switching transistor 31 is turned on and off at a predetermined frequency in the range between several tens of Hz and 100 kHz to generate oscillations across the inductor 33. During a half-cycle of each oscillation, a current flows through the capacitor 34 and the diode 32. The current which would otherwise flow in the opposite direction during the next half-cycle is blocked by the diode 32. Thus, a DC voltage develops across the capacitor 34. Depending on the difference between the voltage developed on the capacitor 34 and a reference voltage, the control circuit 35 regulates the width, or duty ratio of the pulses supplied to the switching transistor 31 in such a way that the voltage difference is reduced substantially to zero. In this manner, the voltage at the output terminal 41 of the DC-DC converter 3 is maintained at a constant level. The control circuit 35 is also responsive to a control signal from the monitoring circuit 7 to set the DC-DC converter 3 in a "run" or "sleep" mode depending on the state of charge of the battery 2.

Therefore, during the run mode, the voltage at the output of DC-DC converter 3 is feed-back controlled by regulating the duty ratio of the drive pulses of switching power transistor 31. During the sleep mode, the feed-back control of DC-DC converter 3 is disabled to allow its output voltage to vary with the voltage of the battery 2.

It is known that in the electrochemical characteristic of a lead-acid battery a linear correlation does exist between its open-circuit voltage and its state of charge. Therefore, by measuring the open-circuit voltage, the state of charge of the lead-acid battery can be determined. However, in the case of a vehicle-mounted lead-acid battery 2, it is usually difficult to set the battery 2 in an open-circuit condition when the vehicle is parked. For this reason, the present invention is based on a result of experiments indicating that, when the charge/discharge current of a lead-acid battery is of significantly small value, the battery is in a condition that can be considered as an open circuit. Therefore, the battery voltage under such open-circuit conditions can be treated as a pseudo-open circuit voltage (or pseudo-OCV), which is substantially equal to the open circuit voltage (OCV). By using the pseudo-open circuit voltage, the state of charge of the lead-acid battery 2 can be determined.

Figure 3:
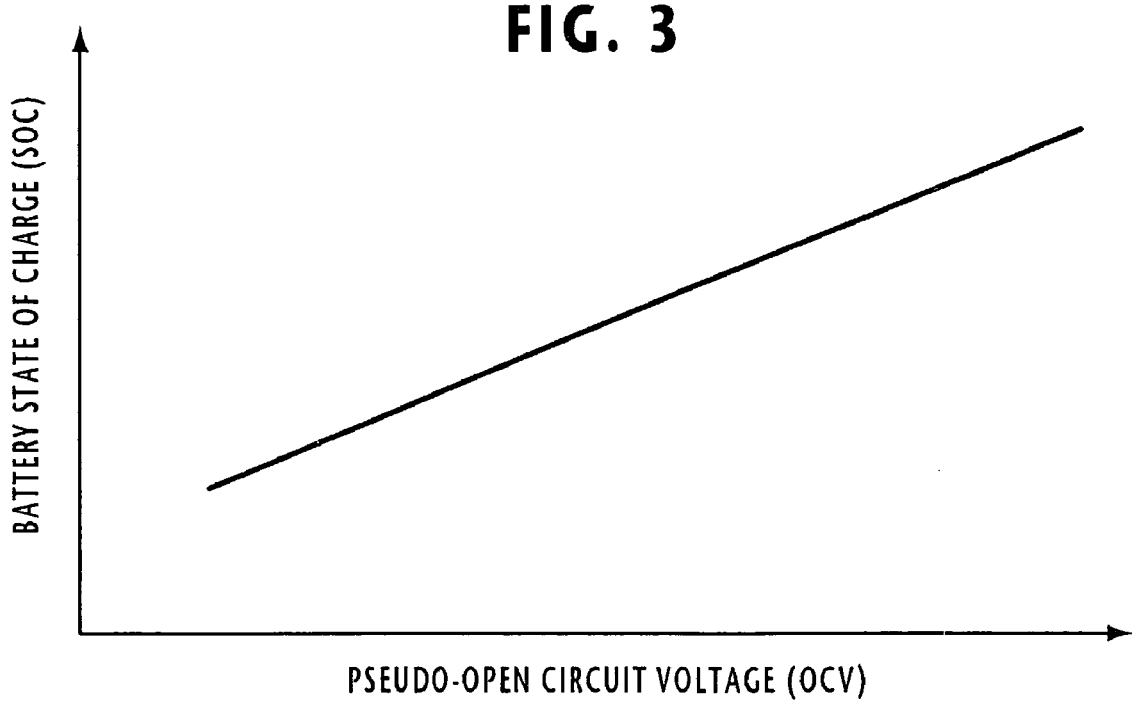
FIG. 3 is a graphic representation of the linear correlation between the pseudo-open circuit voltage of a lead-acid battery and its state of charge.

FIG. 3 shows the graphic representation of the correlation between the pseudo-OCV and the state of charge (SOC) of lead-acid battery 2. As illustrated, the SOC of the battery 2 is proportional to its pseudo-OCV so that the latter increases linearly with the state of charge of the battery 2. As a result, by measuring the pseudo-OCV, the SOC of the lead-acid battery 2 can be determined. Experiments indicate that this linear correlation is valid when the charge/discharge current of the battery 2 is in the range between ±1 ampere and further indicate that the correlation of FIG. 3 varies with the operating temperature of the battery 2. For this reason, a temperature sensor 9 is provided for detecting the operating temperature of the battery 2 and supplies a temperature-indicating signal to the monitoring circuit 7. Monitoring circuit 7 has a plurality of operating patterns respectively corresponding to different temperatures of the battery 2 and selects one of the operating patterns in response to the output of the temperature sensor 9. By monitoring the state of charge of battery 2 represented by the current sensor 8 and the operating state of the vehicle as indicated by the load circuit 4, the monitoring unit 7 controls the operation of DC-DC converter 3 in a "sleep" mode or a "run" mode. As described later, when the vehicle is parked, the monitoring unit 7 starts a timer to begin a timing operation.

At regular intervals, the monitoring unit 7 performs estimation of the state of charge (SOC) of the battery 2 by reading it from a graph describing the correlation between a plurality of SOC values and a corresponding number of pseudo-open circuit voltages and compares the estimated value with a reference value of SOC. If the estimated SOC is lower than the reference value, the monitoring unit 7 sets the DC-DC converter 3 in a "run" mode to charge the battery 2 and integrates the charge current of the battery 2 over time. The time-integrated charge current is divided by the rated capacity of the battery 2 to calculate the SOC value. The run mode continues until the calculated SOC value exceeds a reference value that is higher than the first reference value. At the end of the run mode, the estimated SOC is updated with the calculated value of SOC.

Figure 4:
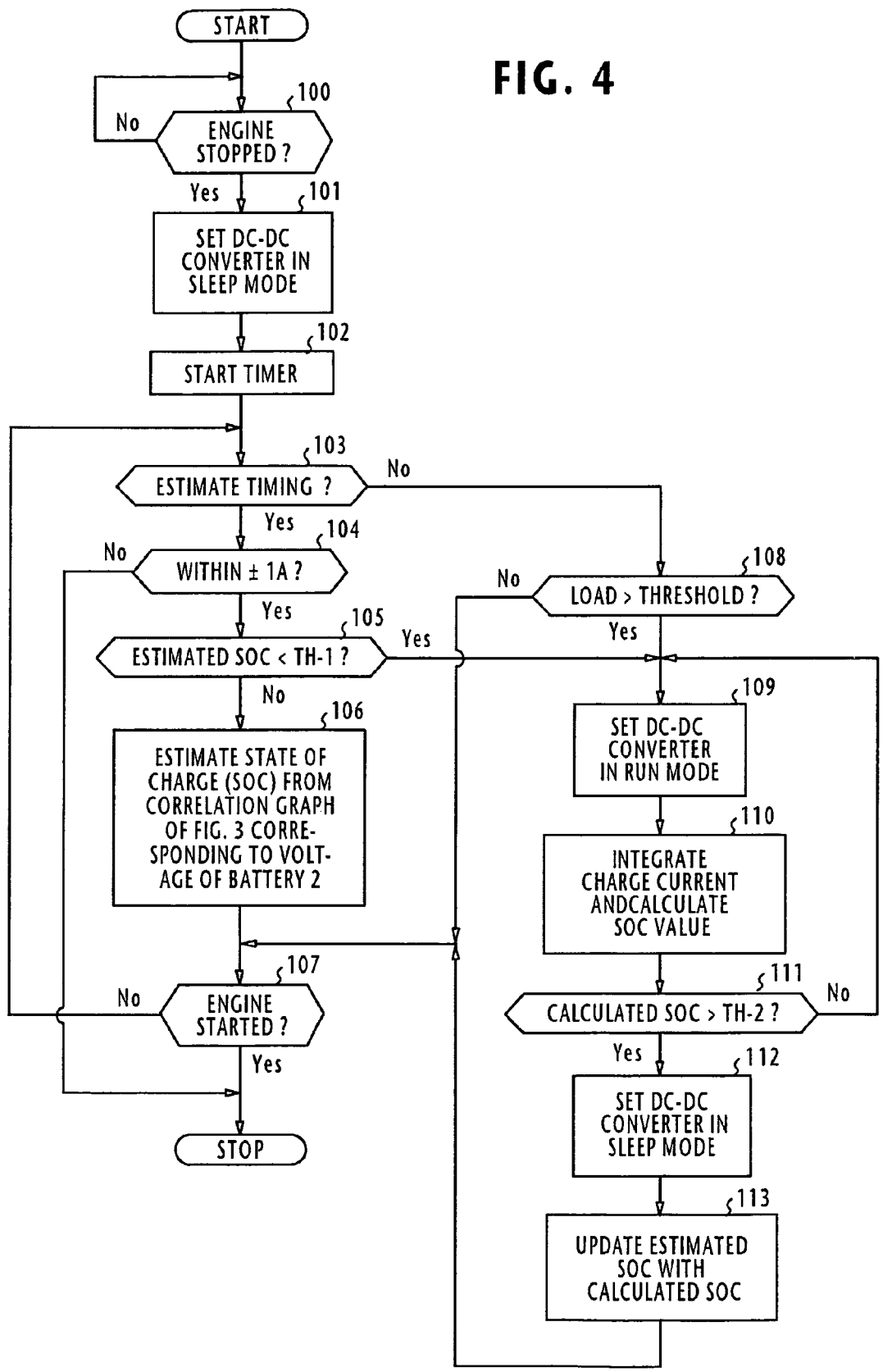
FIG. 4 is a flowchart of the operation of the monitoring unit of FIG. 1.

According to the flowchart of FIG. 4, the operation of monitoring unit 7 proceeds, starting with step 100 where it checks to see if the vehicle engine is stopped. If so, flow proceeds to step 101 to set the DC-DC converter 3 in a sleep mode and then start a timer at step 102. At regular intervals T (where T is several hours), the timer produces an SOC estimate-timing signal. At step 103, the monitoring unit 7 checks to see if estimate timing occurs. If this is the case, flow proceeds to step 104 to determine whether the charge/discharge current detected by the current sensor 8 is within the range of ±1 ampere. If the decision is affirmative, flow proceeds from step 104 to step 105 to make a decision whether the SOC of battery 2 is lower than a lower threshold level TH-1. If the detected current value is outside the permissible range of ±1 ampere, flow proceeds from decision step 104 to the end of the routine. If not, flow proceeds to step 106 to detect the voltage (i.e., pseudo OCV) of the battery 2 and read an SOC value from the correlation graph of FIG. 3 corresponding to the detected pseudo-OCV of the battery 2. Flow proceeds to step 107 to check to see if the engine is started. If the engine is started, the monitoring unit 7 terminates the routine. If the vehicle engine is not yet started, flow returns from step 107 to step 103 to repeat the process.

Note that the voltage regulator 6 is inactive and the DC-DC converter 3 is set in a sleep mode when the vehicle is parked.

If the estimated SOC value becomes lower than the threshold TH-1, the decision at step 105 is affirmative and flow proceeds to step 109 to set the DC-DC converter 3 and the voltage regulator 6 in a run mode in which they are activated for charging the battery 2 with the automotive generator 5. During this run mode, the monitoring unit 7 integrates the charge current of the battery 2, calculates the SOC value and compares it with a higher threshold TH-2 (step 110). The run mode continues until the calculated SOC value exceeds the threshold TH-2 at step 111. Therefore, the DC-DC converter 3 and the voltage regulator 6 are deactivated into a sleep mode again (step 112). At step 113, the estimated SOC value is updated with the calculated SOC value and flow proceeds to step 107.

When the decision at step 103 is negative, flow proceeds to step 108. If the amount of electric load is increased for some reason while the vehicle is parked, the monitoring unit 7 detects this abnormal condition and makes an affirmative decision at step 108 and proceeds to step 109 to set the DC-DC converter 3 in a run mode.

Figure 5:
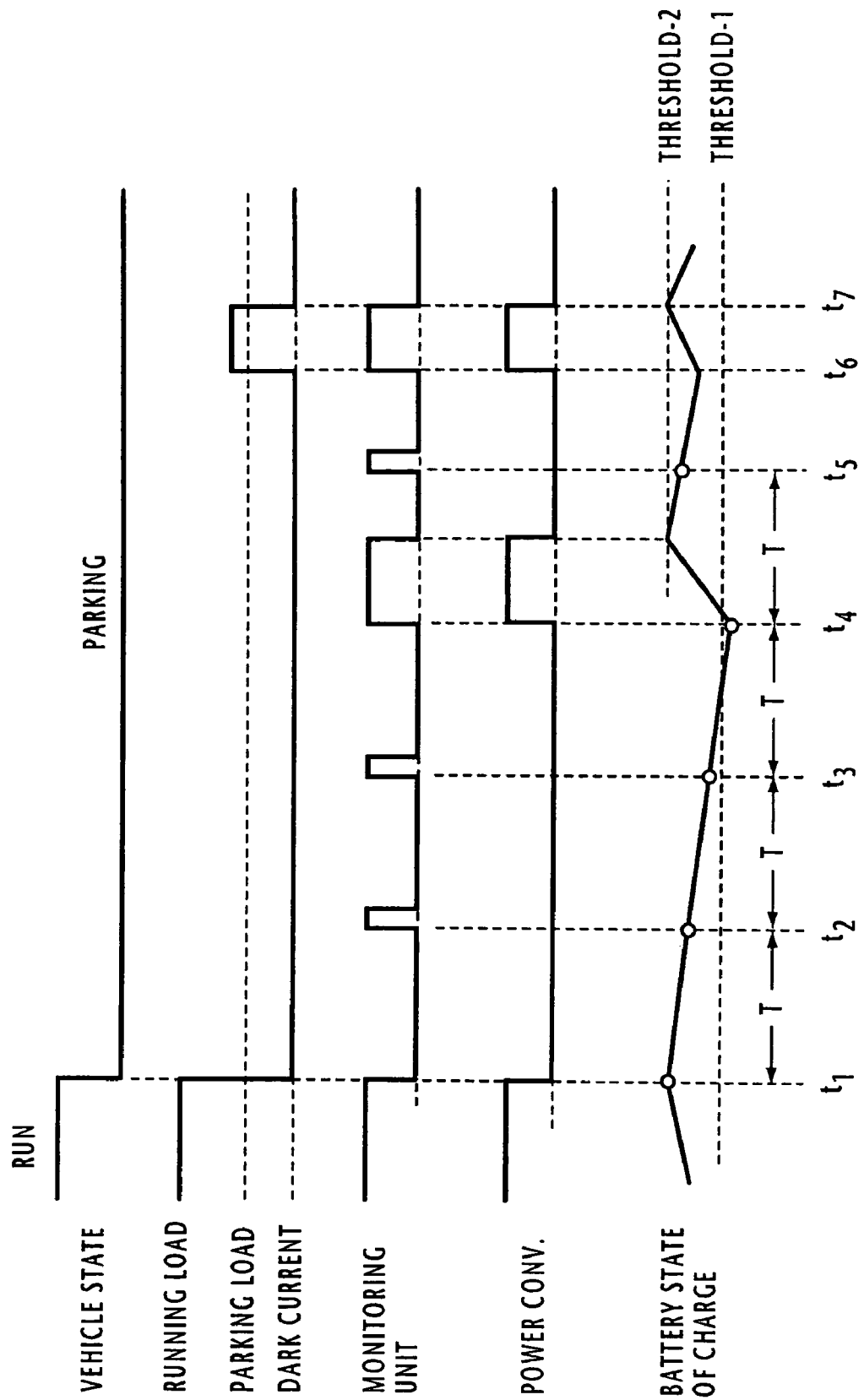
FIG. 5 is a timing diagram for describing the operation of the power supply system.

The following is a description of one example of the operation of the monitoring unit 7 with reference to a timing diagram shown in FIG. 5.

When the vehicle engine is stopped and the key switch is turned off at time $t_1$, the monitoring unit 7 starts a timer to begin a timing operation (step 102). At intervals of several hours, the monitoring unit 7 performs estimation of the state of charge (SOC) of the battery 2 at times $t_2$ and $t_3$ (step 103). If the current detected by the current sensor 8 lies within the range of ±1 ampere and the SOC is above the lower threshold TH-1 (steps 104, 105), the monitoring unit 7 estimates the SOC of the battery 2 by reading the voltage of battery 2 as a pseudo-open circuit voltage (pseudo-OCV) and reading a corresponding battery state of charge (SOC) from the correlation graph of FIG. 3 (step 106).

Assume that the SOC falls below the lower threshold TH-1 during the period between times $t_3$ and $t_4$, the monitoring unit 7 detects this below-threshold condition at time $t_4$ (step 105) and sets the DC-DC converter 3 in a run mode for charging the battery 2 (step 109). This charging operation continues until the calculated SOC value exceeds the higher threshold TH-2 (step 111). During the time the battery 2 is charged, the current detected by the current sensor 8 is integrated and an SOC value is calculated using the integrated current value (step 110). The SOC value estimated at time $t_4$ is updated with the calculated SOC value at the end of the run mode. At time $t_5$, the SOC is again estimated by the monitoring unit 7 at step 106 to renew the previous value.

If a security system (not shown) of the vehicle is triggered by an intruder when the vehicle is parked, the load current will exceed a predetermined threshold level (step 108) at time $t_6$. When this occurs, the monitoring unit 7 sets the DC-DC converter 3 in a run mode to charge the battery 2 (step 109). During this run mode, the monitoring unit 7 integrates the current of the battery 2 and calculates an SOC value (step 110) and updates the estimated SOC with the calculated SOC value at time $t_7$ (step 113). In this manner, the state of charge of the battery 2 is monitored with precision, while keeping its dark current at a minimum. Battery 2 is charged to keep its state of charge (charge rate) from dropping to an unacceptable level with no mechanical to electrical power conversion.

The monitoring of the state of charge of the battery 2 is performed with increased precision by incorporating the temperature of the battery 2 detected by the temperature sensor 9. Specifically, the monitoring unit 7 is provided with a plurality of conversion tables corresponding to different temperatures of the battery 2. Each conversion table describes a correlation between a plurality of SOC values and a corresponding number of pseudo-open circuit voltages at a particular temperature of the battery 2 as shown in FIG. 3. At regular intervals, the monitoring unit 7 selects one of the tables corresponding to the detected battery temperature and proceeds to select an SOC value corresponding to the voltage of the battery 2 as an estimated SOC.

Since the DC-DC converter 3 is operated in a unidirectional (high-to-low) conversion mode by setting the rated voltage of battery 1 higher than that of battery 2, it can be implemented with low-cost simple circuitry.

Figure 6:
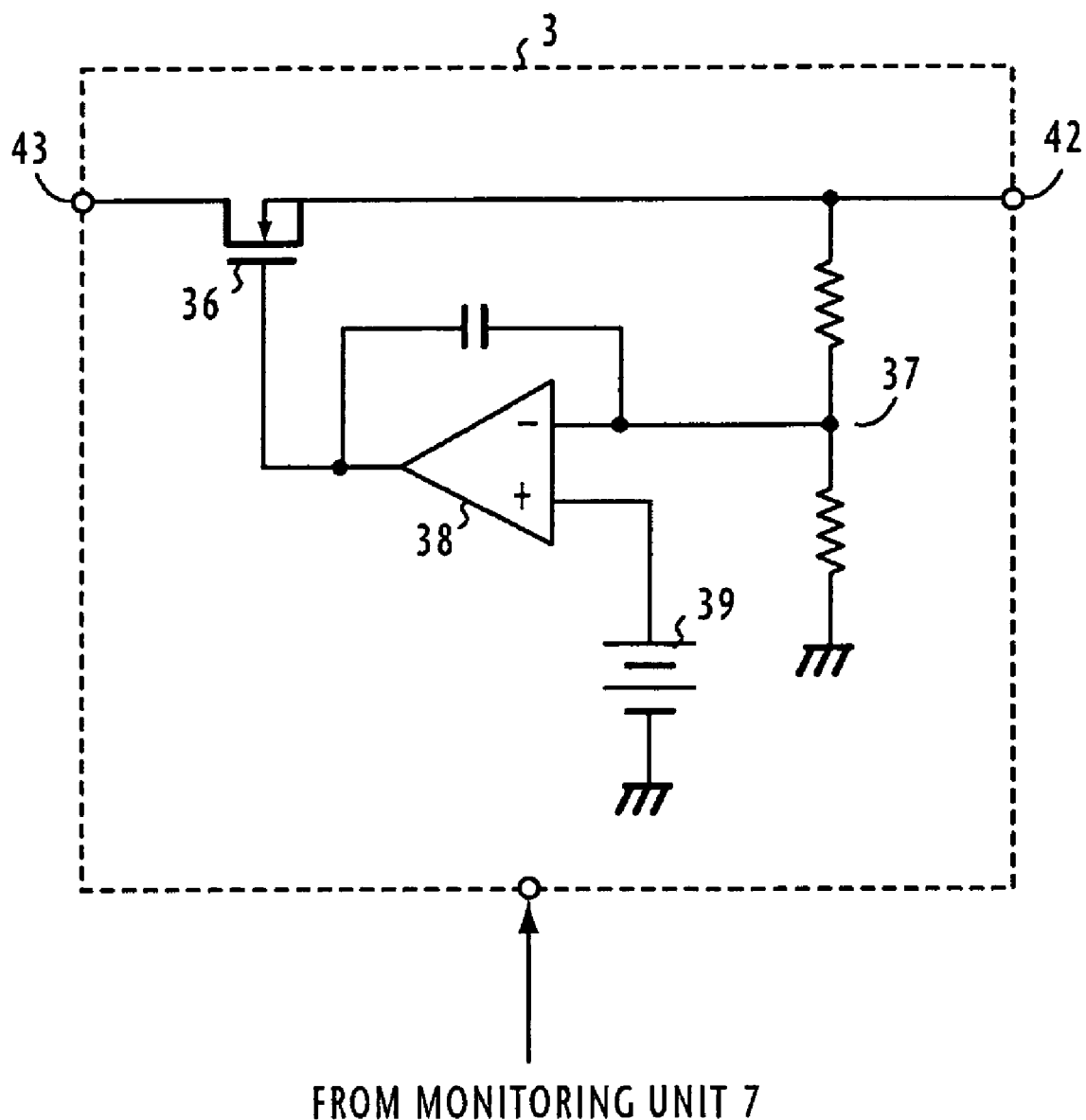
FIG. 6 is a circuit diagram of another example of the DC-DC converter.

FIG. 6 shows another example of the DC-DC converter 3. In this example, a power transistor 36 is provided to operate in a non-saturated mode to serve as a variable resistance between input and output terminals 42 and 43 to which the batteries 1 and 2 are respectively connected. An operational amplifier 38 drives the gate of the power transistor 36 according to a voltage difference between a DC source 39 of reference voltage and a voltage divider 37 connected to the input terminal 42. Due to the absence of switching noise as in the case of the example shown in FIG. 2, this type of DC-DC converter is favorable in terms of electromagnetic compatibility and reduced size.

Figure 7:
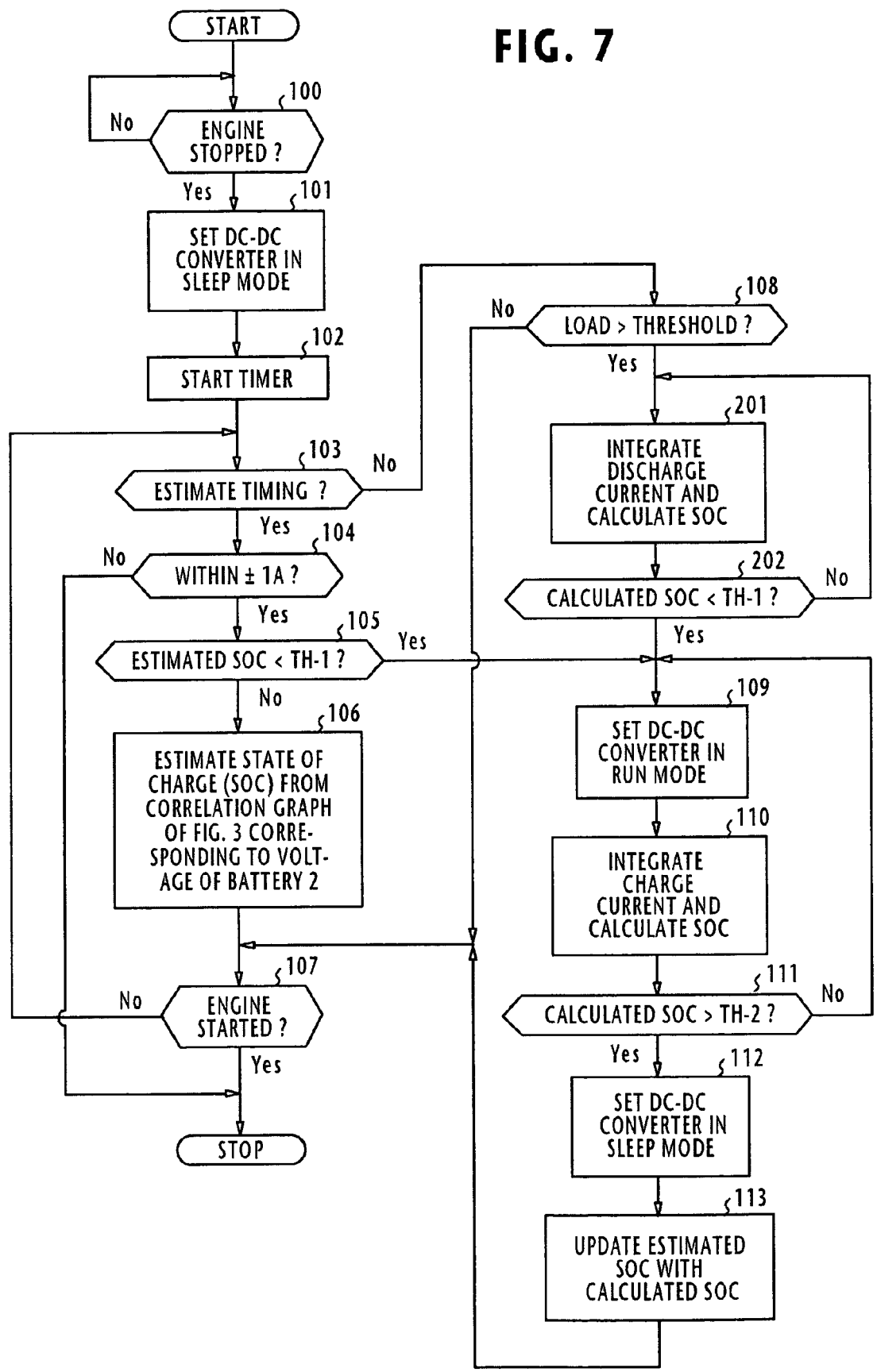
FIG. 7 is a flowchart of the operation of the monitoring unit according to a modified embodiment of the present invention.

FIG. 7 is a modification of the flowchart of FIG. 4. In this modification, additional steps 201 and 202 are provided between decision step 108 and operations step 109. When the electric load of the vehicle exceeds the predetermined threshold for some reason when the vehicle is parked, the decision at step 108 is affirmative and flow proceeds to step 201 to integrate the discharge current and calculate an SOC value using the integrated current value. The calculated SOC value is then compared with the threshold TH-1 at step 202. Steps 201 and 202 are repeated until the calculated SOC falls below the threshold TH-1. When the calculated SOC falls below the threshold TH-1, flow proceeds to step 109 to set the DC-DC converter 3 in a run mode for charging the battery 2. In this way, the vehicle-mounted battery 2 is prevented from being excessively discharged due to an increase in the electric load when the vehicle is parked.

While mention has been made of an embodiment in which lead-acid battery is used for the source battery 1, a lithium battery may also be used instead. In comparison with a lead-acid battery, a lithium battery has a lower internal resistance, which allows it to be quickly charged by the automotive generator with low energy loss following engine acceleration.

What is claimed is:

1. A vehicle-mounted power supply system comprising:
   a first storage battery;
   an automotive generator driven by an engine for generating electrical energy and charging said first storage battery with the generated electrical energy;
   a second storage battery connected to an electrical load;
   a power converter for supplying electric energy from said first storage battery to said second storage battery; and
   a controller for setting said power converter in a sleep mode when said engine is stopped, periodically detecting the voltage of said second storage battery as a pseudo-open circuit voltage during said sleep mode if current of said second storage battery is within a predetermined range, estimating a state of charge of said second storage battery from the detected pseudo-open circuit voltage and setting said power converter in a run mode when the estimated state of charge is lower than a predetermined value.

2. The vehicle-mounted power supply system of claim 1, wherein said controller maintains data describing a correlation between a plurality of state of charge values and a plurality of voltage values, wherein said controller is configured to estimate said state of charge by selecting one of the state of charge values of the selected correlation data corresponding to said detected pseudo-open circuit voltage.

3. The vehicle-mounted power supply system of claim 1, further comprising a temperature sensor for detecting a temperature of said second storage battery, wherein said controller has a plurality of correlation data corresponding to different temperatures of said second storage battery, each of said correlation data describing a correlation between a plurality of state of charge values and a plurality of voltage values, wherein said controller selects one of said correlation data corresponding to the detected temperature of said second storage battery and estimates said state of charge by selecting one of the state of charge values of the selected correlation data corresponding to said detected pseudo-open circuit voltage.

4. The vehicle-mounted power supply system of claim 1, wherein said predetermined range is bounded by ±1 ampere.

5. The vehicle-mounted power supply system of claim 1, wherein said first storage battery has a rated voltage which is higher than a rated voltage of said second storage battery.

6. The vehicle-mounted power supply system of claim 1, wherein said power converter comprises a power transistor configured to operate in a non-saturated mode between said first storage battery and said second storage battery and an amplifier for driving the power transistor according to voltage supplied from said first storage battery.

7. The vehicle-mounted power supply system of claim 1, wherein said controller is configured to:
   integrate charge current of said second storage battery when said power converter is set in said run mode,
   calculate a state of charge from the integrated charge current,
   set the power converter in a sleep mode when the calculated state of charge becomes higher than a predetermined value, and
   update said estimated state of charge with the calculated state of charge.

8. The vehicle-mounted power supply system of claim 1, wherein said first storage battery has an internal resistance lower than an internal resistance of said second storage battery.

9. The vehicle-mounted power supply system of claim 1, wherein said controller is configured to:
   set the power converter in said run mode when said electrical load exceeds a predetermined value,
   integrate charge current of said second storage battery,
   calculate a state of charge from the integrated charge current,
   set the power converter in a sleep mode when the calculated state of charge becomes higher than a predetermined value, and
   update said estimated state of charge with the calculated state of charge.

10. The vehicle-mounted power supply system of claim 1, wherein said controller is configured to:
   integrate discharge current of said second storage battery when said electrical load exceeds a predetermined value,
   calculate a state of charge from the integrated discharge current,
   set the power converter in said run mode when said calculated state of charge is lower than a predetermined value,
   integrate charge current of said second storage battery,
   calculate a state of charge from the integrated charge current,
   set the power converter in a sleep mode when the calculated state of charge becomes higher than a predetermined value, and
   update said estimated state of charge with the calculated state of charge.

11. A method of operating a vehicle-mounted power supply system which comprises a first storage battery, an automotive generator driven by an engine for generating electrical energy and charging the first storage battery with the generated electrical energy, a second storage battery connected to an electrical load, and a power converter for supplying electric energy from said first storage battery to said second storage battery, the method comprising the steps of:
   a) setting said power converter in a sleep mode when said engine is stopped;
   b) periodically detecting the voltage of said second storage battery as a pseudo-open circuit voltage during said sleep mode if current of said second storage battery is within a predetermined range; and
   c) estimating a state of charge of said second storage battery from the detected pseudo-open circuit voltage and setting said power converter in a run mode when the estimated state of charge is lower than a predetermined value.

12. The method of claim 11, wherein said vehicle-mounted power supply system maintains correlation data describing correlation between a plurality of state of charge values and a plurality of voltage values, wherein step (c) comprises the step of estimating said state of charge by selecting one of the state of charge values of the selected correlation data corresponding to said detected pseudo-open circuit voltage.

13. The method of claim 11, wherein said vehicle-mounted power supply system includes a plurality of correlation data corresponding to different temperatures of said second storage battery, each of said correlation data describing a correlation between a plurality of state of charge values and a plurality of voltage values, wherein step (c) comprises the steps of:
   detecting a temperature of said second storage battery;
   selecting one of said correlation data corresponding to the detected temperature of said second storage battery; and
   estimating said state of charge by selecting one of the state of charge values of the selected correlation data in response to said detected pseudo-open circuit voltage.

14. The method of claim 11, wherein said predetermined range is bounded by ±1 ampere.

15. The method of claim 11, wherein said first storage battery has a rated voltage which is higher than a rated voltage of said second storage battery.

16. The method of claim 11, wherein step (c) comprises the steps of:
   integrating charge current of said second storage battery when said power converter is set in said run mode,
   calculating a state of charge from the integrated charge current,
   setting the power converter in a sleep mode when the calculated state of charge becomes higher than a predetermined value, and
   updating said estimated state of charge with the calculated state of charge.

17. The method of claim 11, wherein step (c) comprises the steps of:
   setting the power converter in said run mode when said electrical load exceeds a predetermined value;
   integrating charge current of said second storage battery;
   calculate a state of charge from the integrated charge current, setting the power converter in a sleep mode when the calculated state of charge becomes higher than a predetermined value; and updating said estimated state of charge with the calculated state of charge.

18. The method of claim 11, wherein step (c) comprises the steps of:

integrating discharge current of said second storage battery when said electrical load exceeds a predetermined value, calculating a state of charge from the integrated discharge current, setting the power converter in said run mode when said calculated state of charge is lower than a predetermined value, integrating charge current of said second storage battery, calculating a state of charge from the integrated charge current, set the power converter in a sleep mode when the calculated state of charge becomes higher than a predetermined value, and updating said estimated state of charge with the calculated state of charge.

* * * * *